US012626953B2

(12) United States Patent (10) Patent No.: US 12,626,953 B2
Yamamoto et al. (45) Date of Patent: May 12, 2026

(54) ALL SOLID STATE BATTERY

(71) Applicant: TOYOTA JIDOSHA KABUSHIKI KAISHA, Toyota (JP)

(72) Inventors: Satomi Yamamoto, Miyoshi (JP); Keisuke Omori, Okazaki (JP); Hajime Hasegawa, Aichi-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 537 days.

(21) Appl. No.: 18/313,823

(22) Filed: May 8, 2023

(65) Prior Publication Data

US 2023/0275266 A1 Aug. 31, 2023

Related U.S. Application Data

(63) Continuation of application No. 17/156,031, filed on Jan. 22, 2021, now Pat. No. 11,764,396.

(30) Foreign Application Priority Data

Jan. 31, 2020 (JP) ................................. 2020-015560

(51) Int. Cl.
*H01M 10/0562* (2010.01)
*H01M 10/0525* (2010.01)
(Continued)

(52) U.S. Cl.
CPC ... *H01M 10/0562* (2013.01); *H01M 10/0525* (2013.01); *H01M 10/0585* (2013.01); *H01M 50/54* (2021.01); *H01M 2300/0065* (2013.01)

(58) Field of Classification Search
CPC ......... H01M 10/0562; H01M 10/0525; H01M 10/0585; H01M 50/54
See application file for complete search history.

(56) References Cited

U.S. PATENT DOCUMENTS 11,764,396 B2 * 9/2023 Yamamoto .......... H01M 10/052
                                                    429/304
2006/0093922 A1 5/2006 Kim et al.
(Continued)

FOREIGN PATENT DOCUMENTS

CN       104752774 A      7/2015
CN       109937505 A      6/2019
(Continued)

OTHER PUBLICATIONS

Corrected Notice of Allowability issued May 19, 2022 to U.S. Appl. No. 16/786,473, filed Feb. 10, 2020.
(Continued)

*Primary Examiner* — Olatunji A Godo
(74) *Attorney, Agent, or Firm* — Dinsmore & Shohl LLP

(57) ABSTRACT

An all solid state battery in which shift in positions of a plurality of a cell unit arranged along a thickness direction can be prevented is provided. The all solid state battery includes a plurality of the cell unit connected in series. The all solid state battery includes a cell unit A and a cell unit B, a second current collector AY in the cell unit A and a second current collector BX in the cell unit B are arranged to face each other interposing a first insulating portion, and a tab AX, a tab AY, and a tab B are fixed by a fixing member.

1 Claim, 7 Drawing Sheets

(51) Int. Cl.
    *H01M 10/0585*    (2010.01)
    *H01M 50/54*    (2021.01)

(56) References Cited

U.S. PATENT DOCUMENTS

| | | | |
|---|---|---|---|
| 2007/0196732 | A1 | 8/2007 | Tatebayashi |
| 2009/0047575 | A1 | 2/2009 | Abe |
| 2010/0330410 | A1 | 12/2010 | Takahashi |
| 2011/0129718 | A1 | 6/2011 | Lee |
| 2012/0070720 | A1 | 3/2012 | Aizawa et al. |
| 2013/0295425 | A1 | 11/2013 | Kwon et al. |
| 2013/0295444 | A1 | 11/2013 | Kim et al. |
| 2015/0188195 | A1 | 7/2015 | Matsushita |
| 2018/0026308 | A1 | 1/2018 | Yamada et al. |
| 2018/0315984 | A1* | 11/2018 | Hasegawa ........... H01M 50/583 |
| 2019/0006652 | A1 | 1/2019 | Kim |
| 2019/0252728 | A1 | 8/2019 | Shimizu et al. |
| 2019/0296316 | A1 | 9/2019 | Wang |
| 2020/0038727 | A1 | 2/2020 | Chung |
| 2020/0259128 | A1 | 8/2020 | Tanaka et al. |
| 2020/0280102 | A1 | 9/2020 | Sakamoto |
| 2020/0343519 | A1 | 10/2020 | Kim |
| 2021/0210820 | A1* | 7/2021 | Schmid ............. H01M 10/0562 |
| 2021/0226258 | A1 | 7/2021 | Ohta |
| 2022/0094023 | A1 | 3/2022 | Kamiyama |

FOREIGN PATENT DOCUMENTS

| | | |
|---|---|---|
| CN | 110364673 A | 10/2019 |
| JP | 2004253155 A | 9/2004 |
| JP | 2004-303535 A | 10/2004 |
| JP | 2007250319 A | 9/2007 |
| JP | 2008186595 A | 8/2008 |
| JP | 4563503 B2 | 10/2010 |
| JP | 2010238687 A | 10/2010 |
| JP | 2012069268 A | 4/2012 |
| JP | 5605348 B2 | 10/2014 |
| JP | 2015501064 A | 1/2015 |
| JP | 2017045594 A | 3/2017 |
| JP | 2017054704 A | 3/2017 |
| JP | 2017-204377 A | 11/2017 |
| JP | 2018018600 A | 2/2018 |
| JP | 2018-174074 A | 11/2018 |
| JP | 2018195528 A | 12/2018 |
| JP | 2019194946 A | 11/2019 |
| JP | 2020-006145 A | 1/2020 |
| KR | 10-2006-0047039 A | 5/2006 |
| KR | 20110061281 A | 6/2011 |
| KR | 20130105588 A | 9/2013 |
| KR | 20170135180 A | 12/2017 |
| KR | 20190004150 A | 1/2019 |
| KR | 20190024707 A | 3/2019 |
| WO | 2013137205 W | 9/2013 |
| WO | 2018087970 W | 5/2018 |
| WO | 2019/245137 A1 | 12/2019 |

OTHER PUBLICATIONS

Non-Final Office Action issued Jan. 10, 2022 to U.S. Appl. No. 16/786,473, filed Feb. 10, 2020.

Notice of Allowance issued Jan. 11, 2023 to U.S. Appl. No. 16/786,473, filed Feb. 10, 2020.

Notice of Allowance issued May 3, 2022 to U.S. Appl. No. 16/786,473, filed Feb. 10, 2020.

Notice of Allowance dated Jun. 7, 2023, Issued to U.S. Appl. No. 17/156,031, filed Jan. 22, 2021.

Corrected Notice of Allowability dated Jun. 30, 2023, Issued to U.S. Appl. No. 17/156,031, filed Jan. 22, 2021.

Corrected Notice of Allowability dated Jul. 27, 2023, Issued to U.S. Appl. No. 17/156,031, filed Jan. 22, 2021.

Advisory Action dated Jan. 11, 2024, Issued to U.S. Appl. No. 16/786,473, filed Feb. 10, 2020.

Office Action dated Jun. 3, 2024, issued to U.S. Appl. No. 16/786,473.

Office Action dated Oct. 14, 2021, Issued to U.S. Appl. No. 16/786,473, filed Feb. 10, 2020.

Office Action dated Jun. 20, 2023, Issued to U.S. Appl. No. 16/786,473, filed Feb. 10, 2020.

Final Office Action dated Oct. 3, 2023, Issued to U.S. Appl. No. 16/786,473, filed Feb. 10, 2020.

* cited by examiner

ALL SOLID STATE BATTERY

CROSS REFERENCE TO RELATED APPLICATIONS

This nonprovisional application is a continuation application of U.S. patent application Ser. No. 17/156,031 filed Jan. 22, 2021, which claims priority to Japanese Patent Application No. 2020-015560 filed on Jan. 31, 2020, with the Japan Patent Office, the entire contents which are incorporated herein by reference.

TECHNICAL FIELD

The present disclosure relates to an all solid state battery.

BACKGROUND ART

An all solid state battery is a battery including a solid electrolyte layer between a cathode active material layer and an anode active material layer, and one of the effects thereof is that the simplification of a safety device may be more easily achieved compared to a liquid-based battery including a liquid electrolyte containing a flammable organic solvent. Meanwhile, a battery (bipolar-type battery) including a bipolar electrode, in which a cathode active material layer is arranged on one surface of a current collector and an anode active material layer is arranged on the other side of the current collector, has been known. For example, Japanese Patent Application Laid-Open (JP-A) No. 2004-253155 discloses a bipolar-type battery wherein a part of surrounding portion of electrode is not subjected to an insulation treatment and a part of a current collector is exposed.

In addition, it has been known that a plurality of current collector tabs are fixed by being pinched with clips. For example, Japanese Patent Application Laid-Open (JP-A) No. 2017-054704 discloses a battery comprising a clip for pinching a plurality of current collector tabs located in a belt-like electrode winded in a flat form. Japanese Patent Application Laid-Open (JP-A) No. 2012-069268 discloses an ultrasonic joining method of battery, the method comprising a step of pinching current collector tabs overlapped with a metal foil, with a clipping plate. Further, although it is a stacked-type battery wherein a plurality of unit cells are connected in parallel, Japanese Patent Application Laid-Open (JP-A) No. 2019-194946 discloses a stacked-type battery comprising a clip for holding a plurality of tabs in the stacked direction.

Also, various techniques relating to current collector tabs have been known. For example, Japanese Patent Application Laid-Open (JP-A) No. 2018-018600 discloses a stacked battery comprising a conductive member between adjacent current collector tabs. Japanese Unexamined Patent Publication (JP-A) No. 2015-501064 discloses a cable-type secondary battery wherein a metal tab is a stainless-steel of which surface is processed with carbon, nickel, titanium, or silver. Further, Japanese Patent Application Laid-Open (JP-A) No. 2017-045594 discloses an all solid state battery wherein a calcium oxide layer is present on a surface of a tab portion.

SUMMARY OF DISCLOSURE

Technical Problem

When the bipolar electrode, in which a cathode active material layer is arranged on one surface of a current collector and an anode active material layer is arranged on the other side of the current collector, is used, depending on conditions for pressing to densify each layer during production, difference in elasticity between the anode active material layer and the cathode active material layer may cause deformation of a current collector, which may generate a crack in the anode active material layer or the cathode active material layer. In particular, the generation of the crack is remarkable in an all solid state battery using an inorganic solid electrolyte since it has to be pressed with extremely high pressure during its production.

In contrast, inventors of the present disclosure have obtained a knowledge that an all solid state battery, in which a crack is not easily generated in the anode active material layer or the cathode active material layer, can be obtained when the later described cell unit is used. Further, the inventors have obtained a knowledge that an all solid state battery wherein a plurality of the cell unit is connected in series can be obtained by preparing a plurality of the cell unit and stacking the cell unit interposing an insulating portion to electronically connect specified tabs.

Meanwhile, when such an all solid state battery is produced, each cell unit may move to inner surface direction (orthogonal direction to the thickness direction) during being pressed (during pressing a plurality of the cell unit after arranging the cell unit along the thickness direction) and shift in positions of the cell unit tends to occur. The shift in positions of the cell unit can be a cause of short circuit. The present disclosure has been made in view of the above circumstances, and a main object thereof is to provide an all solid state battery in which the shift in positions of a plurality of the cell unit arranged along the thickness direction can be prevented.

Solution to Problem

In order to achieve the object, the present disclosure provides an all solid state battery comprising a plurality of a cell unit arranged along a thickness direction and connected in series, the all solid state battery includes a cell unit A and a cell unit B as the cell unit; the cell unit A includes: a first current collector A; a first active material layer AX, a solid electrolyte layer AX, a second active material layer AX and a second current collector AX, arranged in order from a first surface side of the first current collector A, and a first active material layer AY, a solid electrolyte layer AY, a second active material layer AY and a second current collector AY, arranged in order from a second surface side opposite to the first surface side of the first current collector A; the cell unit B includes: a first current collector B; a first active material layer BX, a solid electrolyte layer BX, a second active material layer BX and a second current collector BX, arranged in order from a first surface side of the first current collector B, and a first active material layer BY, a solid electrolyte layer BY, a second active material layer BY and a second current collector BY, arranged in order from a second surface side opposite to the first surface side of the first current collector B; the second current collector AY in the cell unit A, and the second current collector BX in the cell unit B are arranged to face each other interposing a first insulating portion; the second current collector AX includes a tab AX at a position not overlapping the second active material layer AX in planar view; the second current collector AY includes a tab AY at a position not overlapping the second active material layer AY in planar view; the first current collector B includes a tab B at a position not overlapping the first active material layer BX and the first active material layer BY in planar view; the tab AX, the tab AY, and the tab B are fixed by a fixing member; the fixing member includes a first holding portion, a second holding portion, and a connecting portion connecting the first holding portion and the second holding portion; and the tab AX, the tab AY, and the tab B are sandwiched and fixed between the first holding portion and the second holding portion of the fixing member.

According to the present disclosure, the tab AX, the tab AY, and the tab B in the cell unit A and the cell unit B are fixed by the fixing member, and thus the shift in positions of a plurality of the cell unit arranged along the thickness direction can be prevented in the all solid state battery.

In the disclosure, the fixing member may be elastic.

In the disclosure, a second insulating portion may be arranged on at least one of an end surface, which is the tab AX side surface, of the first active material layer AX, and an end surface, which is the tab AY side surface, of the first active material layer AY.

In the disclosure, the fixing member may include an insulating shock absorbing portion on at least one of an outer surface side of the first holding portion and an outer surface side of the second holding portion.

In the disclosure, the fixing member may include an elastic filling portion on at least one of an inner surface side of the first holding portion and an inner surface side of the second holding portion.

In the disclosure, a conductive adhesive portion may be arranged on at least one of a position between the tab AX and the tab AY, and a position between the tab AY and the tab B.

In the disclosure, a plated portion may be arranged on at least one of a position between the tab AX and the tab AY, and a position between the tab AY and the tab B.

Effects of Disclosure

The all solid state battery in the present disclosure exhibits an effect such that the shift in positions of a plurality of the cell unit arranged along the thickness direction can be prevented.

DESCRIPTION OF EMBODIMENTS

The all solid state battery in the present disclosure is hereinafter explained in details. In the descriptions of the present application, when it is expressed as, on "surface side" of one member, the other member is arranged, all of when the other member is arranged directly on the surface of one member, when the other member is arranged on the surface of one member interposing an additional member, and when the other member is arranged above the surface of one member setting a specified space in-between, can be included, unless technically contradicted. In addition, in each drawing described as below, the size and the shape of each portion are appropriately exaggerated in order to be understood easily. Further, in each drawing, hatchings or reference signs are appropriately omitted.

Figure 1:
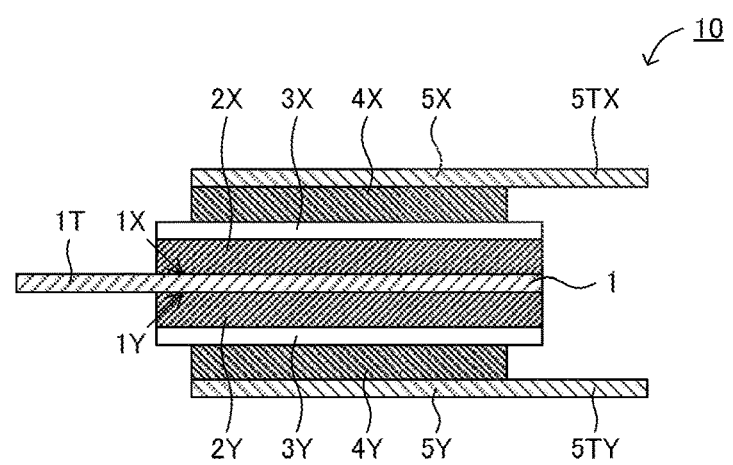
FIG. 1 is a schematic cross-sectional view exemplifying the cell unit in the present disclosure.

FIG. 1 is a schematic cross-sectional view exemplifying the cell unit in the present disclosure. Cell unit 10 illustrated in FIG. 1 includes first current collector 1, and first active material layer 2X, solid electrolyte layer 3X, second active material layer 4X and second current collector 5X, arranged in order from first surface 1X side of the first current collector 1, and first active material layer 2Y, solid electrolyte layer 3Y, second active material layer 4Y and second current collector 5Y, arranged in order from second surface 1Y side opposite to the first surface 1X side of the first current collector 1. The second current collector 5X includes tab 5TX at a position not overlapping the second active material layer 4X in planar view. The second current collector 5Y includes tab 5TY at a position not overlapping the second active material layer 4Y in planer view. The first current collector 1 includes tab 1T at a position not overlapping the first active material layer 2X and the first active material layer 2Y in planar view.

Figure 2:
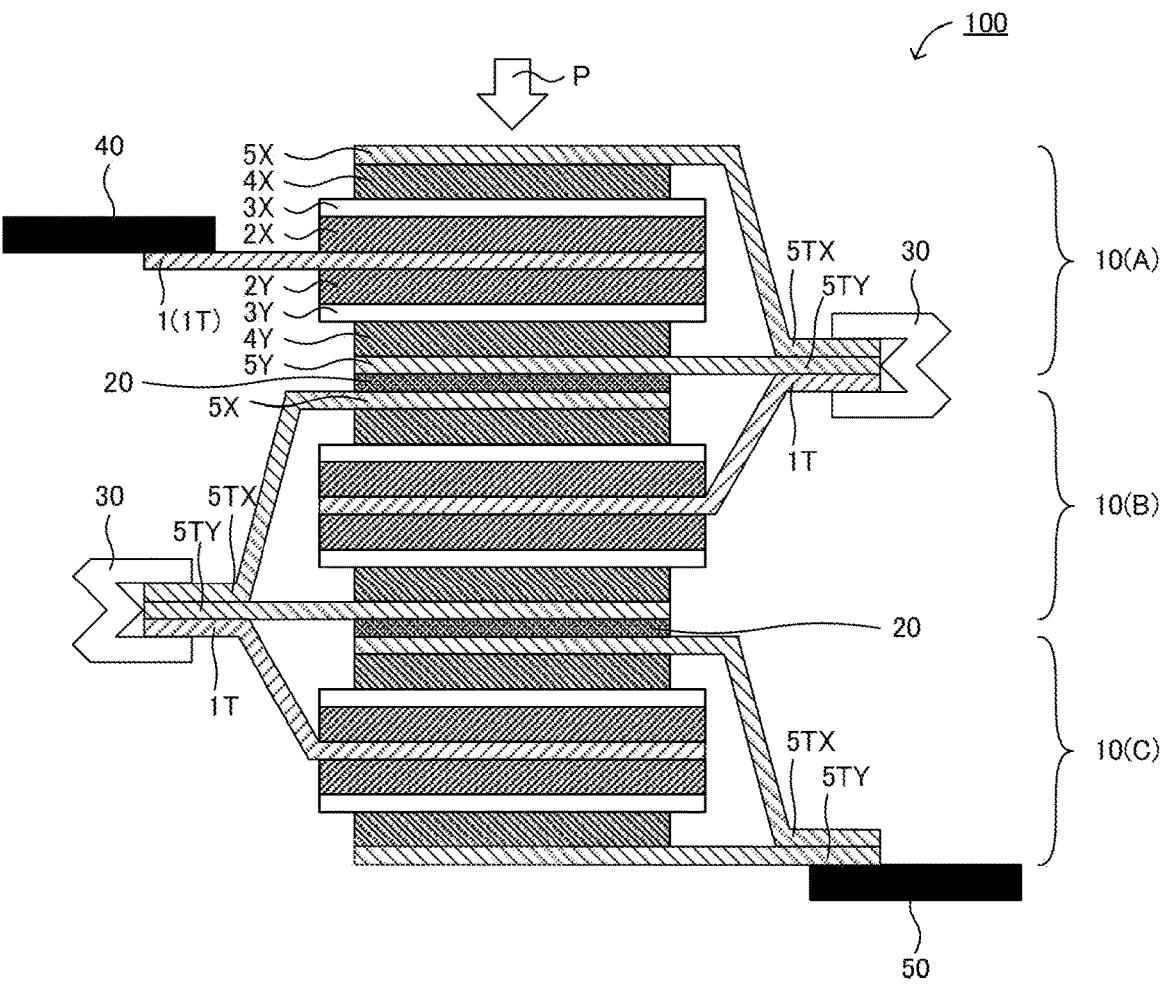
FIG. 2 is a schematic cross-sectional view exemplifying the all solid state battery in the present disclosure.

FIG. 2 is a schematic cross-sectional view exemplifying the all solid state battery in the present disclosure. All solid state battery 100 illustrated in FIG. 2 comprises cell units A to C. Second current collector 5Y (second current collector AY) in the cell unit A, and the second current collector 5X (second current collector BX) in the cell unit B are arranged to face each other interposing first insulating portion 20. Similarly, first insulating portion 20 is arranged between the cell unit B and the cell unit C.

In FIG. 2, the positions of the tab 5TX (tab AX) in the cell unit A, the tab 5TY (tab AY) in the cell unit A, and the tab 1T (tab B) in the cell unit B are fixed by fixing member 30. Similarly, the positions of the tab 5TX (tab BX) in the cell unit B, the tab 5TY (tab BY) in the cell unit B, and the tab 1T (tab C) in the cell unit C are fixed by fixing member 30. In these manners, the cell units A to C are arranged along a thickness direction, and connected in series.

Figure 3:
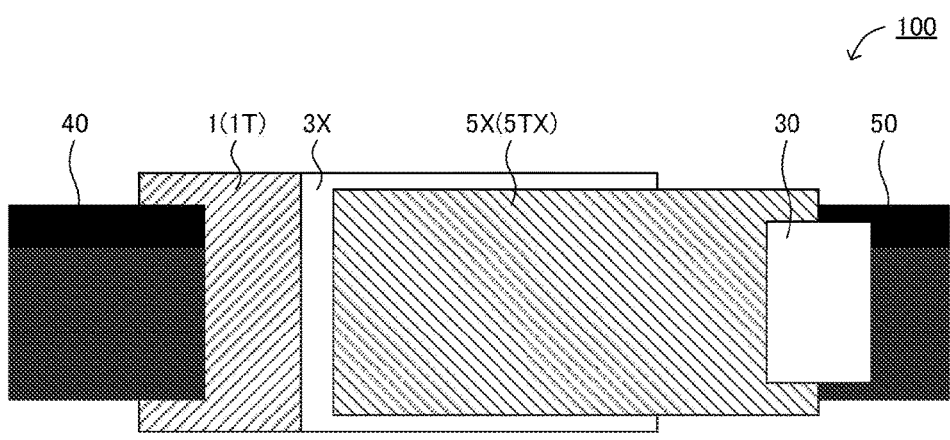
FIG. 3 is a schematic plan view of the all solid state battery shown in FIG. 2 viewed from arrow mark P.

In FIG. 2, the tab 1T (tab A) in the cell unit A is connected to first current collecting terminal 40, and the tab 5TX (tab CX) and the tab 5TY (tab CY) in the cell unit C are connected to second current collecting terminal 50. Also, FIG. 3 is a schematic plan view of the all solid state battery shown in FIG. 2 viewed from arrow mark P. All solid state battery 100 shown in FIG. 3 comprises first current collecting terminal 40, first current collector 1 (first current collector A) including tab 1T (tab A), solid electrolyte layer 3X (solid electrolyte layer AX), second current collector 5X (second current collector AX) including tab 5TX (tab AX), fixing member 30, and second current collecting terminal 50.

According to the present disclosure, the tab AX, the tab AY, and the tab B in the cell unit A and the cell unit B are fixed by the fixing member, and thus the shift in positions of a plurality of the cell unit arranged along the thickness direction can be prevented in the all solid state battery.

As described above, when the bipolar electrode, in which a cathode active material layer is arranged on one surface of a current collector and an anode active material layer is arranged on the other side of the current collector, is used, depending on conditions for pressing, difference in elasticity between the anode active material layer and the cathode active material layer may cause deformation of a current collector, which may generate a crack in the anode active material layer or the cathode active material layer. In contrast, with the cell unit in the present disclosure, the first active material layer X and the first active material layer Y, that are the same pole, are arranged on the both surfaces of the first current collector, and thus the deformation due to the difference in elasticity between the active material layers can be suppressed. Further, with the cell unit in the present disclosure, two cells are formed on the both surfaces of the first current collector (which means that the first current collector works as the current collector for both of the two cells), and thus the energy density can be improved.

In addition, in the present disclosure, by preparing a plurality of the above described cell unit, stacking them interposing a first insulating portion, and electronically connecting the tab AX, the tab AY, and the tab B, an all solid state battery wherein the plurality of the cell unit is connected in series can be obtained. Meanwhile, when such an all solid state battery is produced, each cell unit may move to inner surface direction (orthogonal direction to the thickness direction) during being pressed (during pressing a plurality of the cell unit after arranging the cell unit along the thickness direction) and shift in positions of the cell unit tends to occur. The shift in positions of the cell unit can be a cause of short circuit. Particularly in an all solid state battery using an inorganic solid electrolyte, pressing with extremely high pressure is conducted in order to form good ion conducting path, and thus it is presumed that short circuit due to the shift in positions tends to occur. Necessity of pressing with extremely high pressure and the tendency of occurrence of short circuit due to the shift in positions along with the said pressing can be said the peculiar problems to an all solid state battery. To these problems, the tab AX, the tab AY, and the tab B in the cell unit A and the cell unit B are fixed by a fixing member. Thus, the shift in positions can be prevented even when pressing with extremely high pressure is conducted. As a result, occurrence of short circuit can be suppressed.

1. Constitution of all Solid State Battery

The all solid state battery in the present disclosure comprises a plurality of a cell unit arranged along a thickness direction and connected in series. In addition, the all solid state battery comprises at least a cell unit A and a cell unit B as the cell unit.

Figure 4:
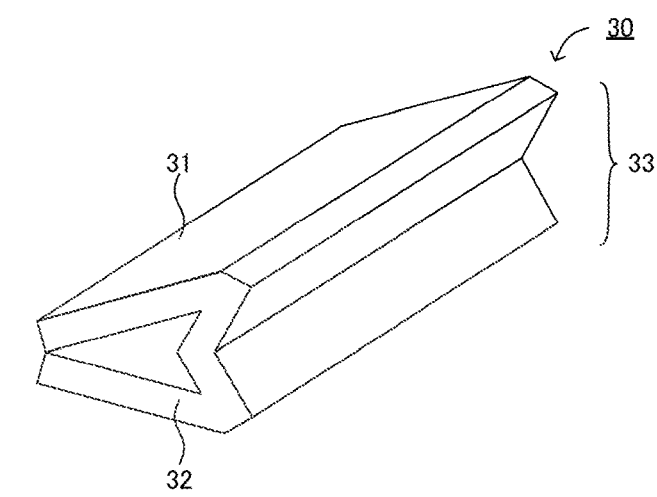
FIG. 4 is a schematic perspective view exemplifying the fixing member in the present disclosure.

Each of tab AX in the cell unit A, tab AY in the cell unit A, and tab B in the cell unit B are at least partially overlaps in planar view and fixed by a fixing member. As shown in FIG. 4, fixing member 30 includes first holding portion 31, second holding portion 32, and connecting portion 33 that connects the first holding portion 31 and the second holding portion 32. Although the fixing member 30 in FIG. 4 includes the first holding portion 31, the second holding portion 32 and the connecting portion 33 that are formed of the same material continuously, each may be a separate member.

Figure 5A:
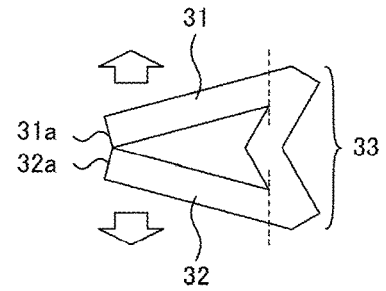
FIG. 5A is a schematic cross-sectional view explaining the fixing member in which an external force is applied in the present disclosure.
Figure 5B:
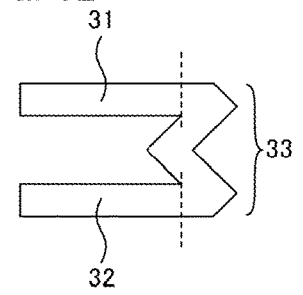
FIG. 5B is a schematic cross-sectional view explaining the fixing member in which end parts of a first holding portion and a second holding portion are distanced in the present disclosure.
Figure 5C:
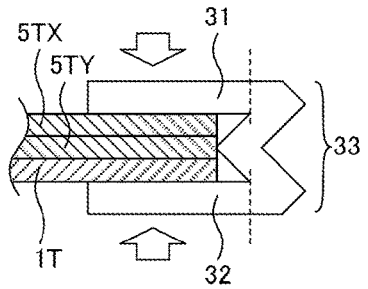
FIG. 5C is a schematic cross-sectional view explaining tabs inserted into the fixing member in the present disclosure.

Further, the fixing member 30 in FIG. 4 shows its elasticity when the connecting portion 33 sags. As shown in FIG. 5A, when external force is applied to the fixing member so that end part 31*a* of the first holding portion 31 and end part 32*a* of the second holding portion 32 are distanced, as shown in FIG. 5B, the connecting portion 33 sags. In that state, as shown in FIG. 5C, when tab 5TX (tab AX), tab 5TY (tab AY) and tab 1T (tab B) are inserted to the fixing member, these tabs are sandwiched between the first holding portion 31 and the second holding portion 32 so as to be fixed in the state of being pressurized in the thickness direction.

The fixing member 30 may be a metal, and may be a resin. In some embodiments, the fixing member 30 is elastic, and/or a clip. "Elastic" refers to the characteristic of a material that the material deformed by an outer force tries to return to its original shape when the outer force is removed. As described above, the fixing member 30 in FIG. 4 shows its elasticity when the connecting portion 33 sags. When the fixing member shows elasticity, the tab 5TX (tab AX), the tab 5TY (tab AY), and the tab 1T (tab B) are pressurized in the thickness direction.

Figure 6A:
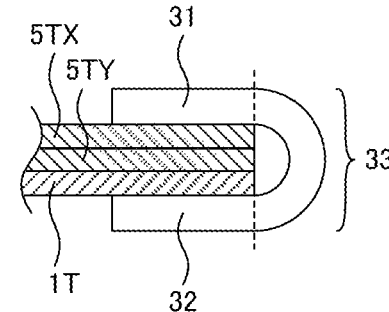
FIG. 6A is a schematic cross-sectional view exemplifying the fixing member having a curved shape in the present disclosure.
Figure 6C:
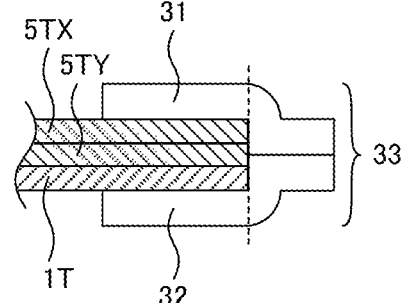
FIG. 6C is a schematic cross-sectional view exemplifying the fixing member formed by crimping members during bonding in the present disclosure.
Figure 6B:
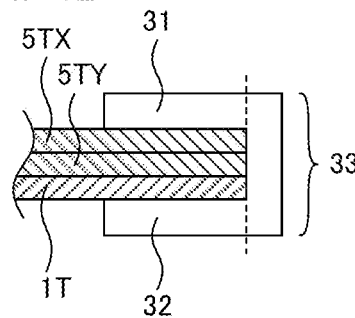
FIG. 6B is a schematic cross-sectional view exemplifying the fixing member having a flat shape in the present disclosure.

In some embodiments, the surfaces of the first holding portion 31 and the second holding portion 32 that face to the tab are respectively flat. The reason therefor is to apply uniform surface pressure to the tab AX, the tab AY and the tab B. The cross-sectional shape of the connecting portion 33 is not particularly limited. For example, the cross-sectional shape of the connecting portion 33 may be in a bent shape as shown in FIG. 5A, may be in a curved shape as shown in FIG. 6A, or may be in a flat shape as shown in FIG. 6B. Incidentally, the fixing member 30 may not be elastic. For example, as shown in FIG. 6C, when the connecting portion 33 is made by bonding a member continuously formed from the first holding portion 31 with a member continuously formed from the second holding portion 32, by crimping the members during bonding, the tab 5TX (tab AX), the tab 5TY (tab AY), and the tab 1T (tab B) are fixed in a state pressurized in the thickness direction.

Figure 7A:
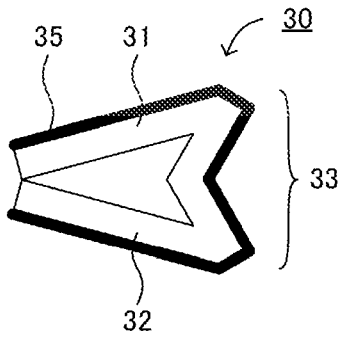
FIG. 7A is a schematic cross-sectional view exemplifying the fixing member having a shock absorbing portion in the present disclosure.

In the present disclosure, the fixing member 30 may include a shock absorbing portion on at least one of an outer surface side of the first holding portion 31 and an outer surface side of the second holding portion 32. When mechanical force such as vibration and shock is applied to the fixing member 30, the fixing member 30 may contact the other members such as a current collecting terminal and an outer package, and the other members may be damaged. To this, by arranging a shock absorbing portion, the damage of the other members can be inhibited. For example, in FIG. 7A, fixing member 30 includes shock absorbing portion 35 which is formed continuously on the outer surface side of first holding portion 31, second holding portion 32, and connecting portion 33.

The "outer surface of first holding portion" refers to a surface of the first holding portion which is the opposite side surface to the second holding portion. Similarly, the "outer surface of second holding portion" refers to a surface of the second holding portion which is the opposite side surface to the first holding portion. In addition, the shock absorbing portion may or may not be insulative. Examples of the material for the shock absorbing portion may include a resin and a rubber.

Figure 7B:
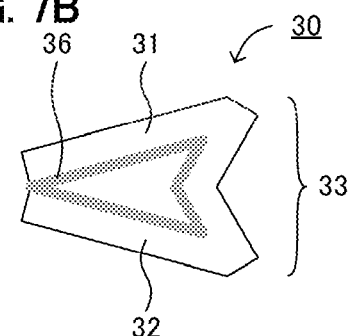
FIG. 7B is a schematic cross-sectional view exemplifying the fixing member having a filling portion in the present disclosure.

In the present disclosure, the fixing member 30 may include an elastic filling portion on at least one of an inner surface side of the first holding portion 31 and an inner surface side of the second holding portion 32. By arranging the filling portion, uniform surface pressure can be applied to the tab AX, the tab AY, and the tab B. For example, in FIG. 7B, fixing member 30 includes filling portion 36 formed continuously on the inner surface side of first holding portion 31, second holding portion 32, and connecting portion 33.

The "inner surface of first holding portion" refers to a surface of the first holding portion which is on the second holding portion side. Similarly, the "inner surface of second holding portion" refers to a surface of the second holding portion which is on the first holding portion side. In addition, the filling portion may or may not be insulative. Examples of the material for the filling portion may include a resin and a rubber.

In the present disclosure, the second current collector AY in the cell unit A and the second current collector BX in the cell unit B are arranged so as to face to each other interposing a first insulating portion. As shown in FIG. 2 described above, the second current collector 5Y (second current collector AY) in the cell unit A and the second current collector 5X (second current collector BX) in the cell unit B are arranged so as to face to each other interposing the first insulating portion 20. As an example of the material for the first insulating portion, a resin may be exemplified. Examples of the resin may include polyolefin such as polyethylene and polypropylene; polyester such as polyethylene terephthalate (PET); polyurethane, and polyimide. An additional example of the material for the first insulating portion may be a metal oxide. For example, a coat of metal oxide may be formed by oxidizing the surface of the current collector, and the coat may be used as the first insulating portion. The same materials may be used for the insulating portions to be described later.

Figure 8:
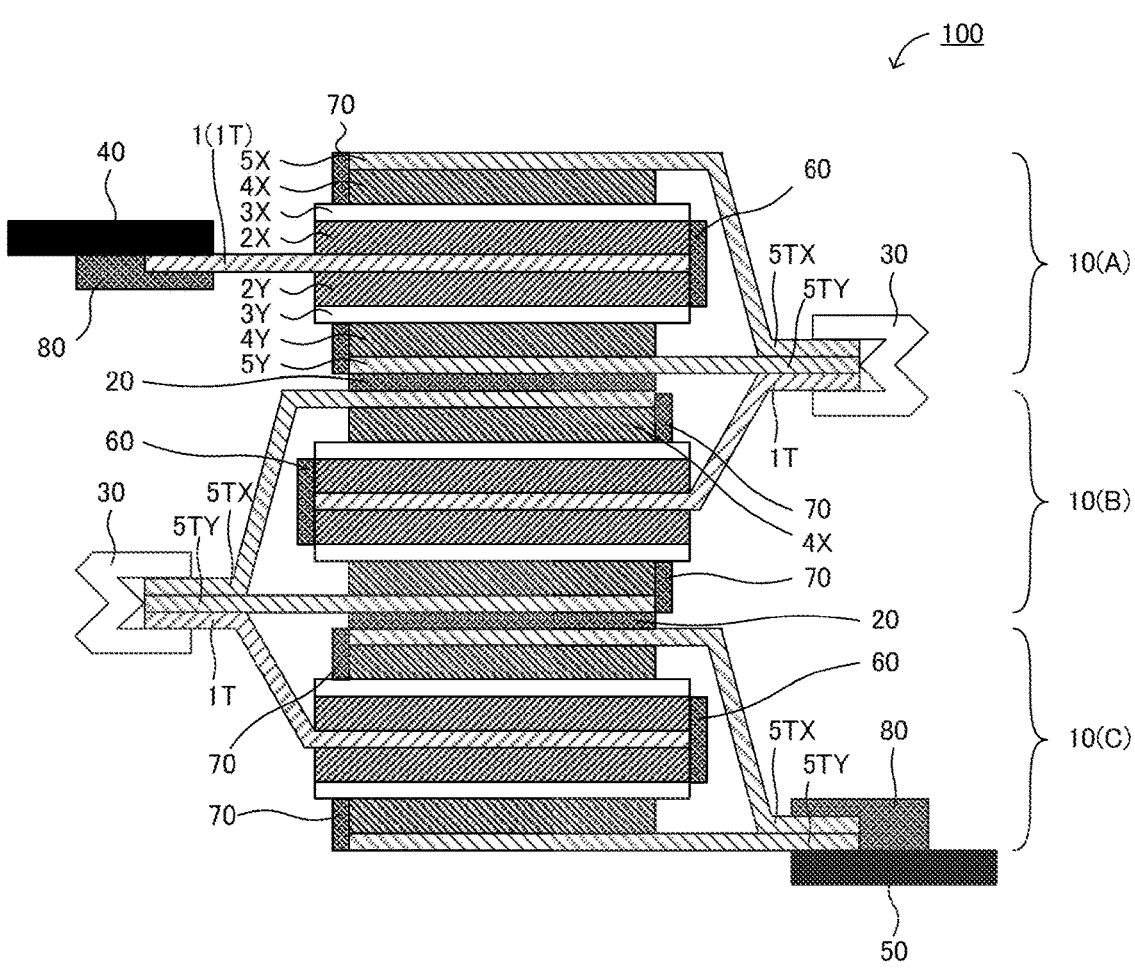
FIG. 8 is a schematic cross-sectional view exemplifying the all solid state battery in the present disclosure.

In the present disclosure, a second insulating portion 60 may be arranged on at least one of an end surface, which is the tab AX side surface, of the first active material layer AX, and an end surface, which is the tab AY side surface, of the first active material layer AY. The reason therefor is to suppress occurrence of short circuit. In FIG. 8, second insulating portion 60 is formed and arranged continuously on the tab 5TX (tab AX) side end surface of the first active material layer 2X (first active material layer AX) in the cell unit A, and the tab 5TY (tab AY) side end surface of the first active material layer 2Y (first active material layer AY) in the cell unit A. The second insulating portion 60 is also arranged in the cell unit B and the cell unit C in the same manner.

In the present disclosure, a third insulating portion 70 may be arranged on at least one of an end surface, which is the tab A side surface, of the second active material layer AX, and an end surface, which is the tab A side surface, of the second active material layer AY. The reason therefor is to suppress the occurrence of short circuit. In FIG. 8, third insulating portion 70 is arranged respectively on the tab 1T (tab A) side end surface of the second active material layer 4X (second active material layer AX) in the cell unit A, and the tab 1T (tab A) side end surface of the second active material layer 4Y (second active material layer AY) in the cell unit A. The third insulating portion 70 is also arranged in the cell unit B and the cell unit C in the same manner. In addition, as shown in FIG. 8, the third insulating portion 70 may cover respectively the end surface of the second current collector 5X (second current collector AX) in the cell unit A, and the end surface of the second current collector 5Y (second current collector AY) in the cell unit A.

Further, in FIG. 8, although the first insulating portion 20 arranged between the cell unit A and the cell unit B is a different member from the third insulating portion 70 that covers the end surface of the second active material layer 4Y (second active material layer AY) in the cell unit A, these may be continuously formed. Similarly, in FIG. 8, although the first insulating portion 20 arranged between the cell unit A and the cell unit B is a different member from the third insulating portion 70 that covers the end surface of the second active material layer 4X (second active material layer BX) in the cell unit B, these may be continuously formed.

In the present disclosure, a fourth insulating portion 80 may be arranged at a position overlapping the fixing member 30 in planar view. By arranging the fourth insulating portion 80, for example, the occurrence of short circuit can be suppressed even when the outer surface side of the fixing member 30 has conductivity. In FIG. 8, fourth insulating portion 80 is arranged at a position overlapping the fixing member 30 in planar view. Meanwhile, in the present disclosure, the fourth insulating portion 80 may not be arranged at a position overlapping the fixing member 30 in planar view. For example, when the fixing member 30 includes an insulating portion on at least one of the outer surface side of the first holding portion and the outer surface side of the second holding portion, necessity of arranging the fourth insulating portion 80 is low. In that case, the producing process of an all solid state battery can be simplified. Examples of the insulating portion may include the above described shock absorbing portion 35 (insulating shock absorbing portion).

Figure 9:
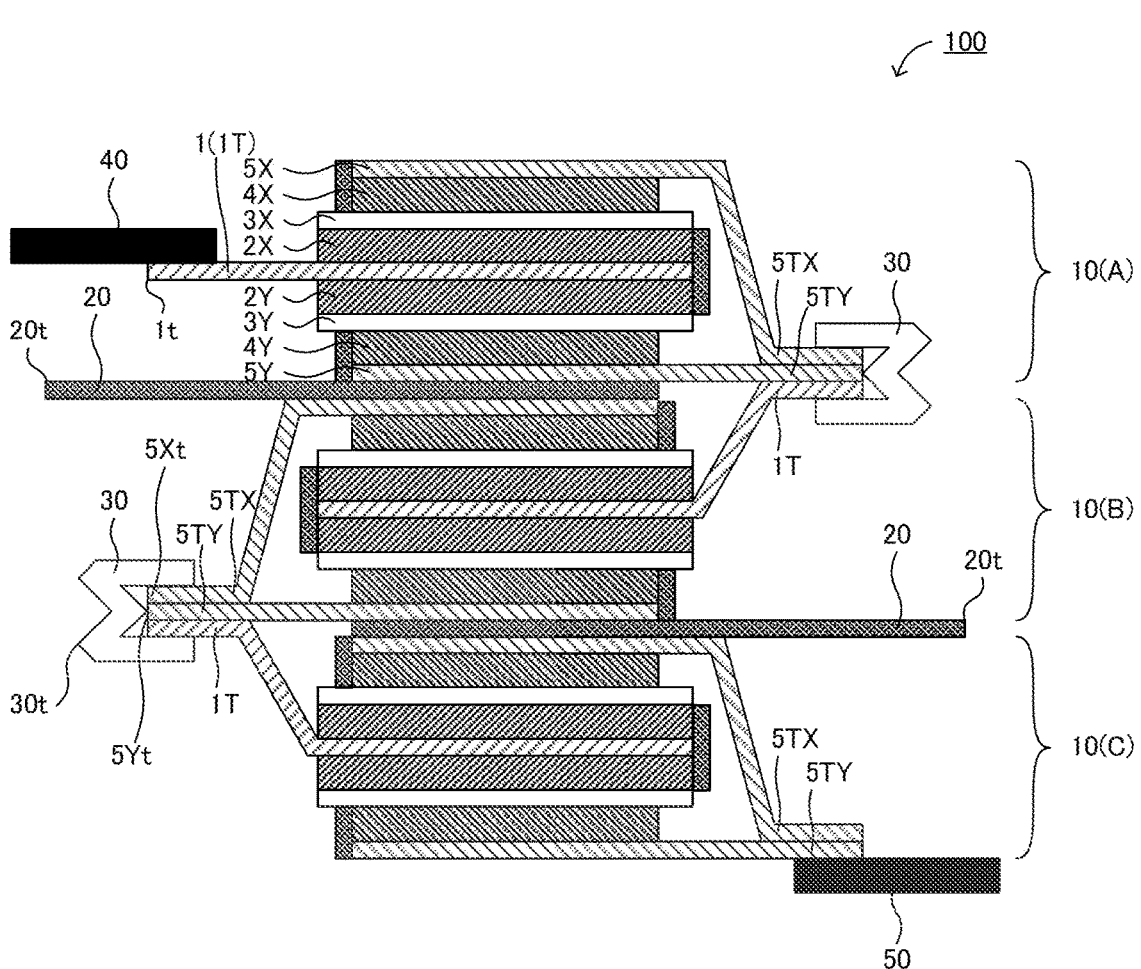
FIG. 9 is a schematic cross-sectional view exemplifying the all solid state battery in the present disclosure.

In the present disclosure, an end part 20t of the first insulating portion 20, in planar view, may be positioned at outer side with respect to at least one of the end part of the tab A in the first current collector A, the end part of the tab BX in the second current collector BX, and the end part of the tab BY in the second current collector BY. The reason therefor is to suppress the occurrence of short circuit. In FIG. 9, end part 20t of first insulating portion 20 in planar view is positioned at outer side with respect to end part 1t of the tab A (tab 1T) in the first current collector A (first current collector 1), end part 5Xt of the tab BX (tab 5TX) in the second current collector BX (second current collector 5X), and end part 5Yt of the tab BY (tab 5TY) in the second current collector BY (second current collector 5Y). Also, as shown in FIG. 9, the end part 20t of the first insulating portion 20 in planar view may be positioned at outer side with respect to end part 30t of the fixing member 30.

Figure 10:
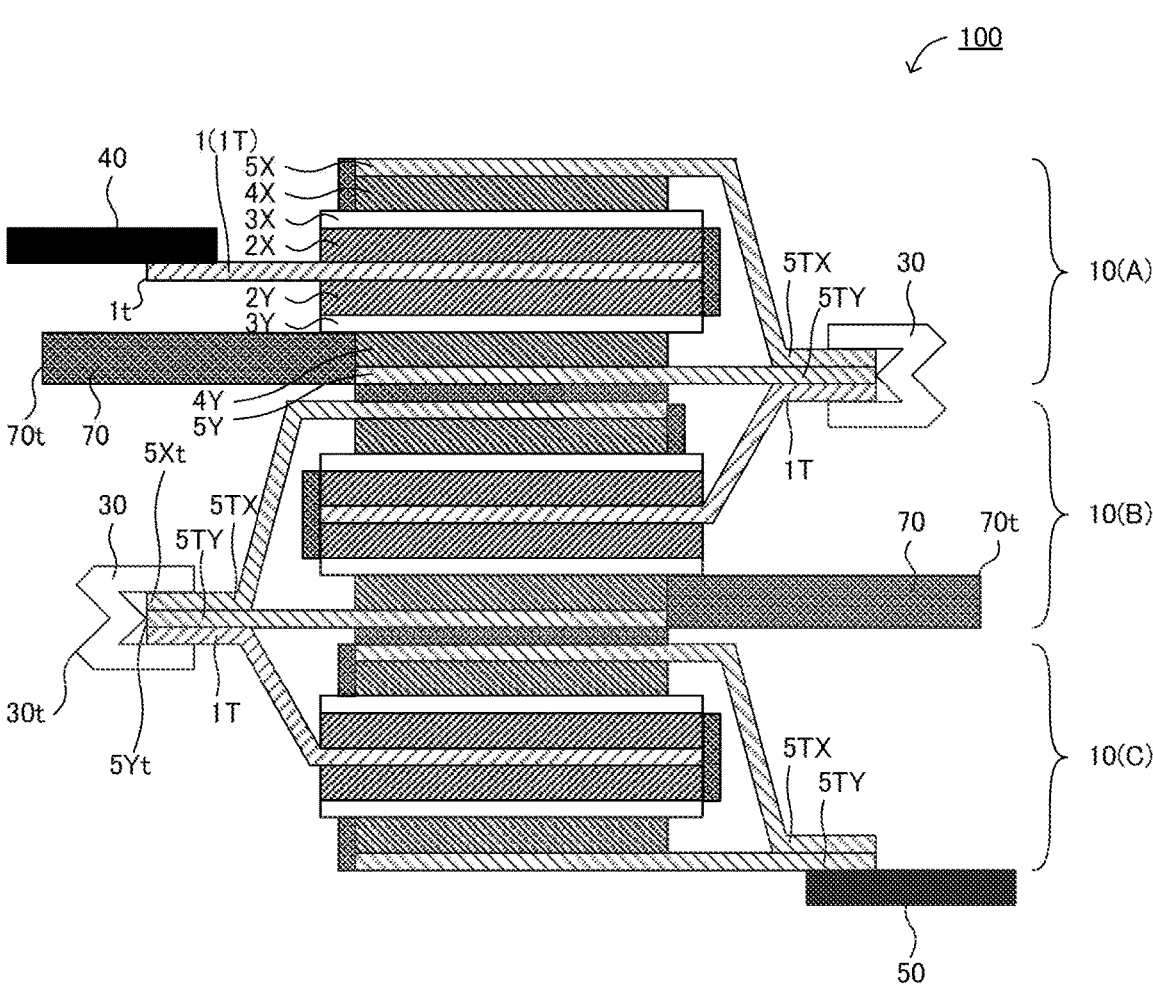
FIG. 10 is a schematic cross-sectional view exemplifying the all solid state battery in the present disclosure.

In the present disclosure, an end part 70*t* of the third insulating portion 70 in planar view may be positioned at outer side with respect to at least one of the end part of the tab A in the first current collector A, the end part of the tab BX in the second current collector BX, and the end part of the tab BY in the second current collector BY. The reason therefor is to suppress the occurrence of short circuit. In FIG. 10, end part 70*t* of the third insulating portion 70, which covers the end surface of the second active material layer BY (second active material layer 4Y) in the cell unit A, in planar view is, positioned at outer side with respect to end part 1*t* of the tab A (tab 1T) in the first current collector A (first current collector 1), end part 5X*t* of the tab BX (tab 5TX) in the second current collector BX (second current collector 5X), and end part 5Y*t* of the tab BY (tab 5TY) in the second current collector BY (second current collector 5Y). Also, as shown in FIG. 10, end part 70*t* of the third insulating portion 70 in planar view may be positioned at outer side with respect to end part 30*t* of the fixing member 30.

Figure 11:
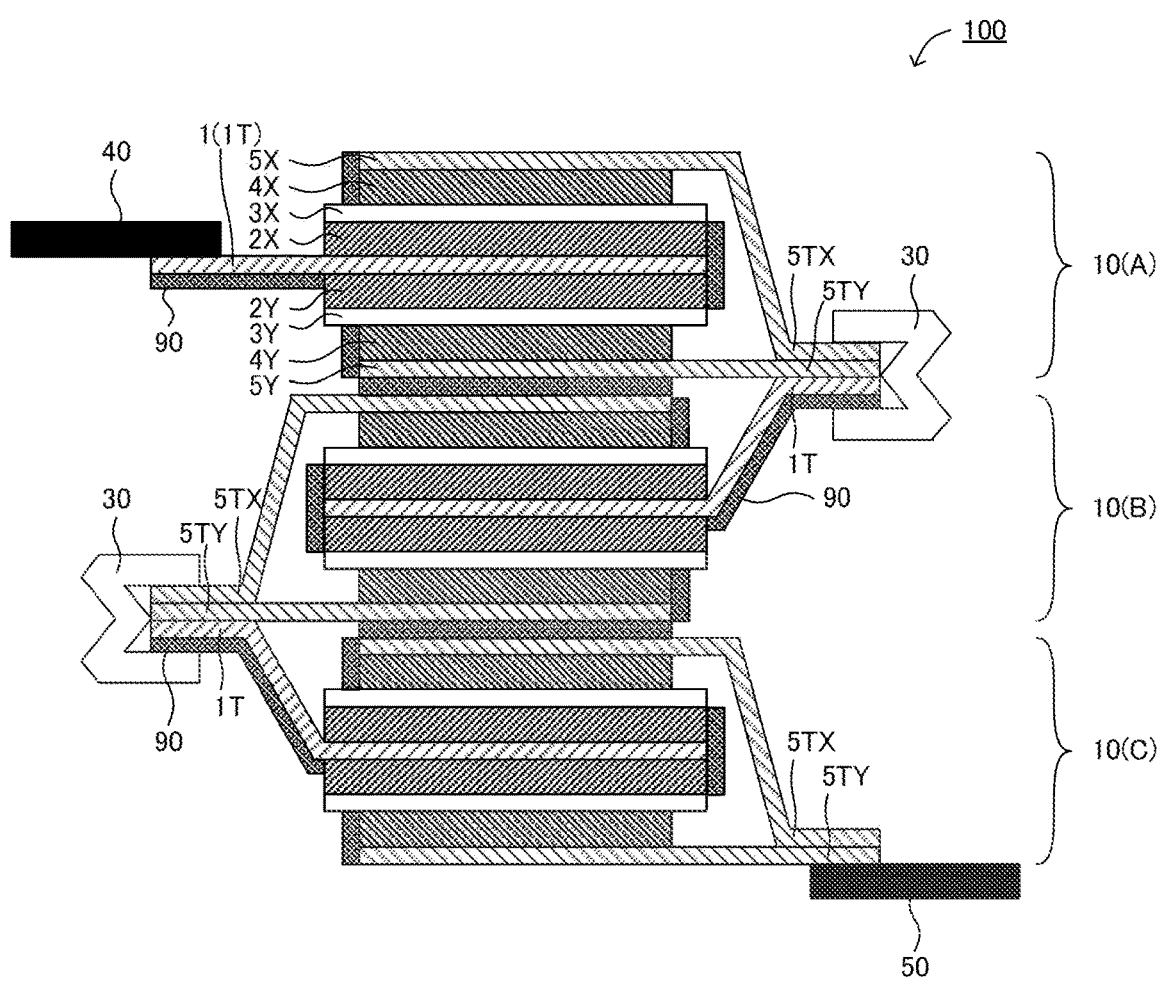
FIG. 11 is a schematic cross-sectional view exemplifying the all solid state battery in the present disclosure.

In the present disclosure, the tab A in the first current collector A may include a fifth insulating portion 90 on the second surface side. Similarly, the tab B in the first current collector B may include a fifth insulating portion on the second surface side. The reason therefor is to suppress the occurrence of short circuit. In FIG. 11, the tab A (tab 1T) of the first current collector A (first current collector 1) includes fifth insulating portion 90 on the second surface side, and the tab A (tab 1T) of the first current collector B (first current collector 1) also includes fifth insulating portion 90 on the second surface side. In the present disclosure, the above described first insulating portion to fifth insulating portion may be arbitrarily used in combination.

In the present disclosure, a conductive adhesive portion 11*a*, 11*b* may be arranged on at least one of a position between the tab AX and the tab AY, and a position between the tab AY and the tab B. For example, when mechanical force such as vibration and shock is applied to the fixing member 30, the tab AX, the tab AY, and the tab B may be damaged due to the weight of the fixing member 30. To this, by arranging the conductive adhesive portion 11*a*, 11*b*, mechanical strength of these tabs improves and the damage is not easily caused. Incidentally, when a plurality of the cell unit is connected in series, current value flows in each of the cell unit is small compared with when a plurality of the cell unit is connected in parallel; thus, excessive exothermic reaction does not easily occur in the conductive adhesive portion 11*a*, 11*b* even when the resistance of the conductive adhesive portion is comparatively high (e.g. higher compared with that of metal bond).

Figure 12A:
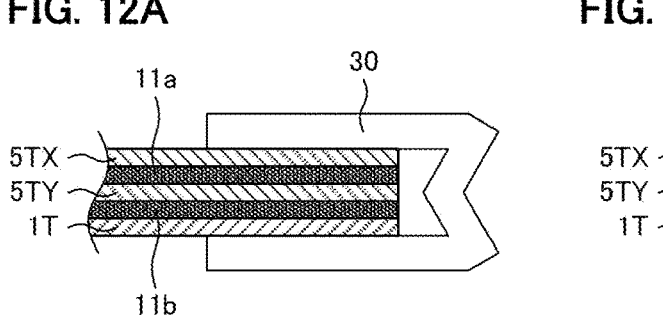
FIG. 12A is a schematic cross-sectional view exemplifying the tab having conductive adhesive portions and the fixing member in the present disclosure.

For example, in FIG. 12A, conductive adhesive portion 11*a* is arranged at a position between the tab 5TX (tab AX) in the cell unit A and the tab 5TY (tab AY) in the cell unit A. Similarly, in FIG. 12A, conductive adhesive portion 11*b* is arranged at a position between the tab 5TY (tab AY) in the cell unit A and the tab 1T (tab B) in the cell unit B.

As an example of the conductive adhesive portion 11*a*, 11*b*, a solidified material or a sintered material of a conductive paste can be exemplified. Examples of the conductive paste may include a paste containing powder of metal such as Ag. When the conductive paste is used, for example, the conductive adhesive portion 11*a*, 11*b* may be formed in a manner such that the cell unit A and the cell unit B are arranged along the thickness direction interposing the first insulating portion, and then the conductive paste is applied thereto to solidify or sinter the paste.

Further, additional examples of the conductive adhesive portion 11*a*, 11*b* may include a conductive tape. Examples of the conductive tape may include a tape including a base material such as nonwoven fabric, and a conductive layer formed on the both surfaces of the base material. A peeling layer may be arranged on the surfaces of the conductive layer. When the conductive tape is used, the conductive adhesive portion 11*a*, 11*b* may be formed in a manner such that, first, one of the peeling layer of the conductive layer is peeled off, and the conductive tape is attached to the cell unit in the state the other peeling layer of the conductive layer remains not peeled off, and then the cell unit A and the cell unit B are arranged along the thickness direction interposing the first insulating portion, then, the other peeling layer of the conductive layer is peeled off to press the exposed conductive layer.

Further, in the present disclosure, a plated portion 12*a*, 12*b*, 12*c*, 12*d* may be arranged on at least one of a position between the tab AX and the tab AY, and a position between the tab AY and the tab B. When the tab AX, the tab AY, and the tab B are fixed by the fixing member 30, the contact resistance among the tabs may be increased depending on the conditions of the surface of the tabs. To this, the conditions of the surface of the tabs are reformed by arranging the plated portion, and thus the contact resistance among the tabs can be decreased.

Figure 12B:
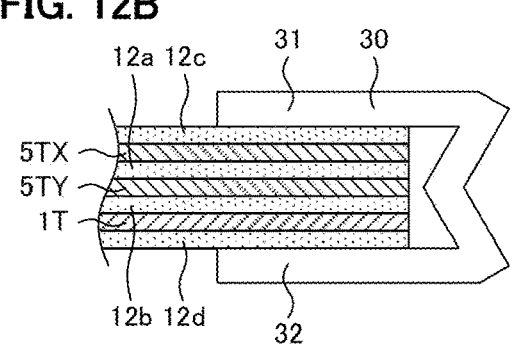
FIG. 12B is a schematic cross-sectional view exemplifying the tab having plated portions and the fixing member in the present disclosure.

For example, in FIG. 12B, plated portion 12*a* is arranged between the tab 5TX (tab AX) in the cell unit A and the tab 5TY (tab AY) in the cell unit A. Similarly, in FIG. 12B, plated portion 12*b* is arranged between the tab 5TY (tab AY) in the cell unit A and the tab 1T (tab B) in the cell unit B. Further, in FIG. 12B, plated portion 12*c* is arranged between the first holding portion 31 in the fixing member 30 and the tab 5TX (tab AX) in the cell unit A. Compatibility in the interface between the fixing member 30 and the tab 5TX (tab AX) improves when the plated portion 12*c* is arranged, and thus the fixation by the fixing member 30 is uniformed. Similarly, in FIG. 12B, plated portion 12*d* is arranged between the second holding portion 32 in the fixing member 30 and the tab 1T (tab B) in the cell unit B.

In some embodiments, the hardness of metal in the plated portion 12*a*, 12*b*, 12*c*, 12*d* may be smaller than that of the metal in the tabs. The hardness signifies, for example, Vickers hardness. Examples of the metal in the plated portion 12*a*, 12*b*, 12*c*, 12*d* may include Au, Ni, Sn, and an alloy containing at least one of these elements. The plated portion may be formed on a part of the overlapping region where 12*a*, 12*b*, 12*c*, 12*d* the tab AX, the tab AY, and the tab B overlap in planner view, or may be formed entirely on the overlapping region.

The all solid state battery in the present disclosure comprises a plurality of a cell unit arranged along a thickness direction and connected in series. The number of the cell unit is at least two or more, may be 3 or more, may be 10 or more, and may be 20 or more. On the other hand, the number of the cell unit is, for example, 1000 or less, and may be 500 or less. In some embodiments, when the number of the cell unit is 3 or more, two of the cell unit facing to each other may have the same relationship as the relationship between the cell unit A and the cell unit B described above. In addition, the all solid state battery usually comprises an outer package for storing a plurality of the cell unit. The outer package may or may not be flexible. As an example of the former case, an aluminum laminate film can be exemplified. Further, the all solid state battery may be a primary battery and may be a secondary battery. The reason therefor is to be repeatedly charged and discharged, and useful as, for example, a car-mounted battery.

2. Constitution of Cell Unit

The all solid state battery in the present disclosure comprises a plurality of a cell unit arranged along a thickness direction and connected in series.

The cell unit includes: a first current collector; a first active material layer X, a solid electrolyte layer X, a second active material layer X and a second current collector X, arranged along the thickness direction in order from a first surface side of the first current collector; and a first active material layer Y, a solid electrolyte layer Y, a second active material layer Y, and a second current collector Y, arranged along the thickness direction in order from a second surface side opposite to the first surface side of the first current collector. The kind of the cell unit is not particularly limited, but in some embodiments, the cell unit is a lithium ion battery.

The first current collector may be an anode current collector, and may be a cathode current collector. In the former case, the second current collector would be a cathode current collector, and in the latter case, the second current collector would be an anode current collector. Examples of the material for the cathode current collector may include aluminum, SUS, nickel, and carbon. Examples of the material for the anode current collector may include copper, SUS, nickel, and carbon. Examples of the shape of the current collector may include a foil shape.

The first current collector includes a tab at a position not overlapping the first active material layer. Here, when a part of the first current collector overlapping the first active material layer in planar view is regarded as an overlapping portion, in some embodiments, the material of the tab may be the same material as that of the overlapping portion. In some embodiments, the first current collector may be formed continuously from the overlapping portion to the tab. Regarding these points, the same applies to the second current collector.

The first active material layer may be an anode active material layer and may be a cathode active material layer. In the former case, the second active material layer would be a cathode active material layer, and in the latter case, the second current collector would be an anode active material layer. In some embodiments, the electrode area of the anode active material layer may be larger than the electrode area of the cathode active material layer. The reason therefore is to obtain an all solid state battery with higher safety. The active material layer contains at least an active material, and may contain at least one of a solid electrolyte, a conductive material, and a binder.

Examples of the cathode active material may include an oxide active material. Examples of the oxide active material may include a rock salt bed type active material such as $LiCoO_2$, $LiMnO_2$, $LiNiO_2$, $LiVO_2$, and $LiNi_{1/3}Co_{1/3}Mn_{1/3}O_2$; a spinel type active material such as $LiMn_2O_4$, $Li(Ni_{0.5}Mn_{1.5})O_4$, and $Li_4Ti_5O_{12}$; and an olivine type active material such as $LiFePO_4$, $LiMnPO_4$, $LiNiPO_4$, and $LiCoPO_4$. Examples of the shape of the cathode active material may include a granular shape.

Examples of the anode active material may include a metal active material, a carbon active material, and an oxide active material. Examples of the metal active material may include Li, In, Al, Si, Sn, and an alloy including at least one kind of these. Examples of the carbon active material may include graphite, hard carbon, and soft carbon. Examples of the oxide active material may include $Li_4Ti_5O_{12}$, SiO, and $Nb_2O_5$. Examples of the shape of the anode active material may include a granular shape.

Examples of the solid electrolyte may include an inorganic solid electrolyte such as a sulfide solid electrolyte, an oxide solid electrolyte, a nitride solid electrolyte, and a halide solid electrolyte. In some embodiments, the sulfide solid electrolyte may contain, for example, a Li element, an X element (X is at least one kind of P, As, Sb, Si, Ge, Sn, B, Al, Ga, and In), and a S element. Also, the sulfide solid electrolyte may further contain at least one of an O element and a halogen element. Examples of the shape of the solid electrolyte may include a granular shape. In addition, examples of the conductive material may include a carbon material. Further, examples of the biner may include a rubber-based binder and a fluoride-based binder.

The solid electrolyte layer contains at least a solid electrolyte, and may contain a binder as required. The solid electrolyte and the binder are as described above.

The present disclosure is not limited to the embodiments. The embodiments are exemplification, and any other variations are intended to be included in the technical scope of the present disclosure if they have substantially the same constitution as the technical idea described in the claim of the present disclosure and offer similar operation and effect thereto.

REFERENCE SIGNS LIST 1 first current collector
2 first active material layer
3 solid electrolyte layer
4 second active material layer
5 second current collector
10 cell unit
20 first insulating portion
30 fixing member
31 first holding portion
32 second holding portion
33 connecting portion
40 first current collecting terminal
50 second current collecting terminal
60 second insulating portion
70 third insulating portion
80 fourth insulating portion
90 fifth insulating portion
100 all solid state battery

What is claimed is:

1. An all solid state battery comprising a plurality of a cell unit arranged along a thickness direction and connected in series, the all solid state battery includes a cell unit A and a cell unit B as the cell unit, the cell unit A includes:

a first current collector A, a first active material layer AX, a solid electrolyte layer AX, a second active material layer AX and a second current collector AX, arranged in order from a first surface side of the first current collector A, and a first active material layer AY, a solid electrolyte layer AY, a second active material layer AY and a second current collector AY, arranged in order from a second surface side opposite to the first surface side of the first current collector A, the cell unit B includes:

a first current collector B, a first active material layer BX, a solid electrolyte layer BX, a second active material layer BX and a second current collector BX, arranged in order from a first surface side of the first current collector B, and a first active material layer BY, a solid electrolyte layer BY, a second active material layer BY and a second current collector BY, arranged in order from a second surface side opposite to the first surface side of the first current collector B, the second current collector AY in the cell unit A, and the second current collector BX in the cell unit B are arranged to face each other interposing a first insulating portion, the second current collector AX includes a tab AX at a position not overlapping the second active material layer AX in planar view, the second current collector AY includes a tab AY at a position not overlapping the second active material layer AY in planar view, the first current collector B includes a tab B at a position not overlapping the first active material layer BX and the first active material layer BY in planar view, the tab AX, the tab AY, and the tab B are fixed by a fixing member, the fixing member includes a first holding portion, a second holding portion, and a connecting portion connecting the first holding portion and the second holding portion, and the tab AX, the tab AY, and the tab B are sandwiched and fixed between the first holding portion and the second holding portion of the fixing member, the fixing member is elastic, the tab AX, the tab AY, and the tab B are pressurized in the thickness direction by sagging of the connecting portion, wherein a first distance is a distance between the first holding portion and the second holding portion in the thickness direction at an end of a connecting portion-side in a state the fixing member does not sandwich the tab AX, the tab AY, and the tab B, wherein the second distance is a distance between the first holding portion and the second holding portion in the thickness direction at a position located on an inner-side of the end of the connecting portion-side in the state the fixing member does not sandwich the tab AX, the tab AY, and the tab B, wherein the second distance is smaller than the first distance.

* * * * *